United States Patent [19]

Olson et al.

[11] 3,911,752

[45] Oct. 14, 1975

[54] REMOTE CONTROL APPARATUS FOR TELEVISION RECEIVERS

[75] Inventors: Joyce L. Olson, 1219 S. Thomas St., Arlington, Va. 22204; Stephen A. Lazorcak, Jr., Arlington, Va.

[73] Assignee: Joyce L. Olson, Arlington, Va.

[22] Filed: Mar. 13, 1974

[21] Appl. No.: 450,686

[52] U.S. Cl. .................. 74/10 A; 74/142; 74/578; 192/46; 200/161; 200/331; 334/8
[51] Int. Cl.². F16D 41/00; H03J 1/00; H01H 17/08
[58] Field of Search ........ 74/10 A, 126, 142, 577 S, 74/578; 192/46; 200/161, 331; 334/8, 9, 10

[56] References Cited
UNITED STATES PATENTS

| | | | |
|---|---|---|---|
| 351,238 | 10/1886 | Williams | 192/46 |
| 716,041 | 12/1902 | Houghtaling | 192/46 |
| 2,482,435 | 9/1949 | Poole | 192/46 X |
| 2,769,344 | 11/1956 | Block et al. | 74/10 A |
| 3,643,052 | 2/1972 | Marshall, Jr. | 200/161 |

FOREIGN PATENTS OR APPLICATIONS

| | | | |
|---|---|---|---|
| 26,366 | 10/1915 | Norway | 200/331 |
| 25,658 | 2/1920 | Denmark | 200/331 |
| 595,781 | 4/1934 | Germany | 200/161 |
| 24,637 | 6/1914 | Norway | 200/331 |

*Primary Examiner*—Allan D. Herrmann
*Attorney, Agent, or Firm*—Shlesinger Arkwright, Garvey & Dinsmore

[57] ABSTRACT

Apparatus for controlling a television receiver by mechanically changing the channel setting thereof from a remote viewing position. The apparatus includes a control shaft having a bore in fitting engagement with the channel selector shaft of the receiver. An arm having an enlarged opening at one end is loosely mounted on the control shaft and a dog extends outwardly from one face of the arm adjacent the opening. The dog selectively engages the teeth of a body member which is mounted on, and rotatable with, the control shaft. A flexible line is connected to the outer terminal of the arm and, upon upward movement being exerted on the line, the arm rotates in a counterclockwise direction to effect corresponding movement of the dog and body member with resultant counterclockwise rotation of the control shaft and channel selector shaft to change the channel setting of the receiver.

7 Claims, 7 Drawing Figures

U.S. Patent  Oct. 14, 1975  3,911,752
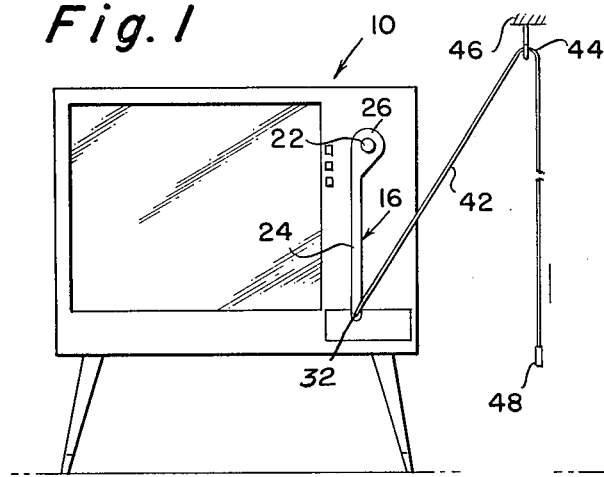
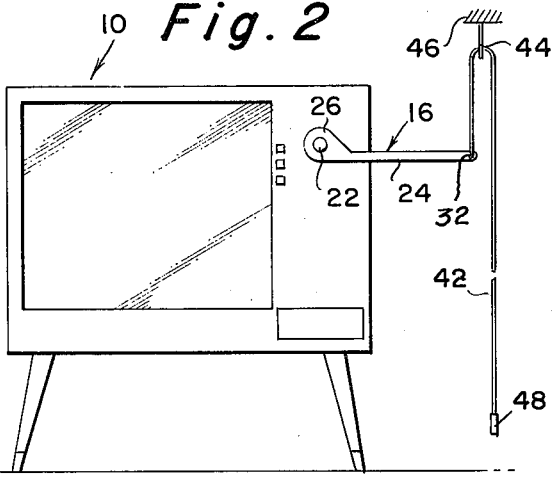
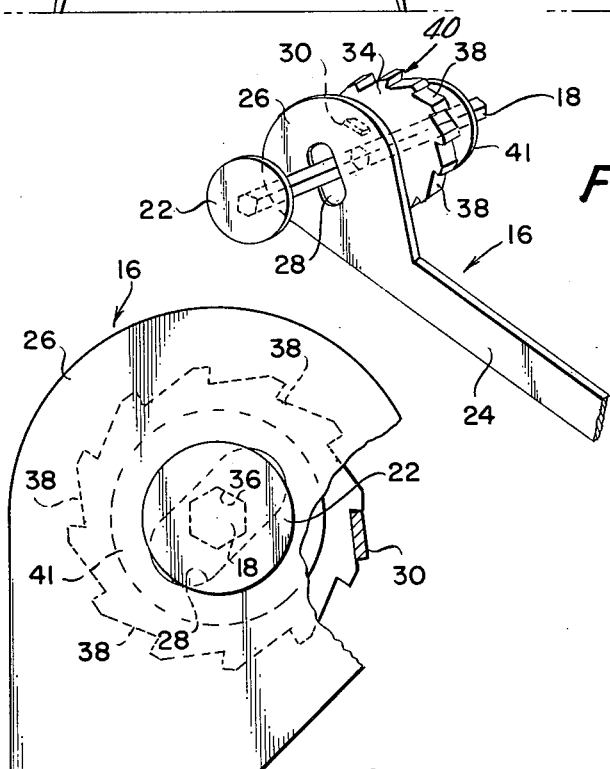
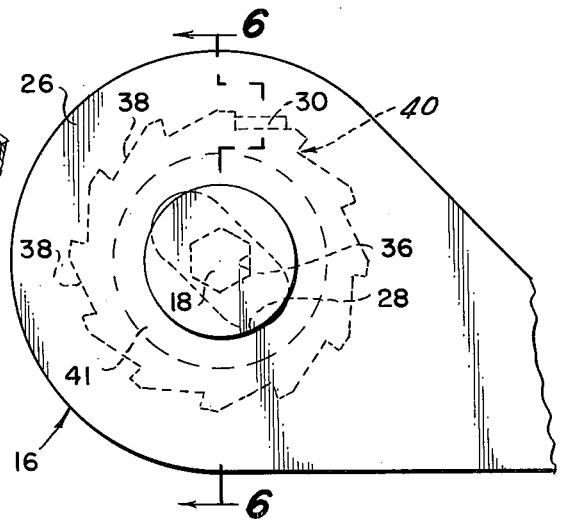
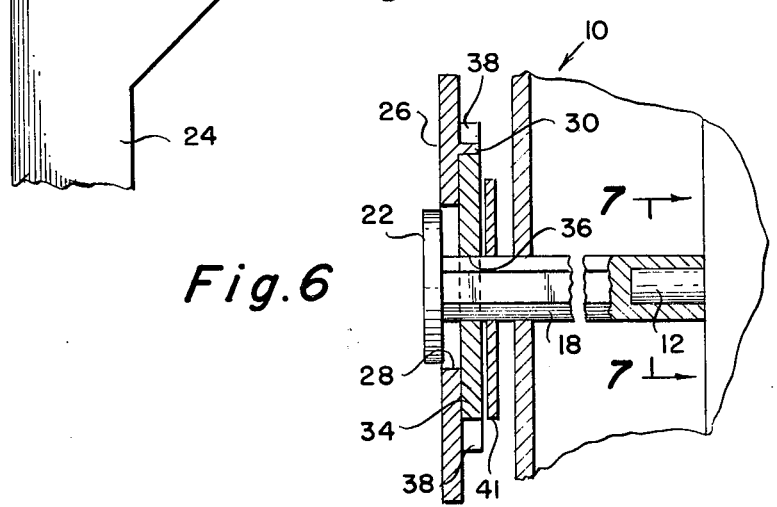
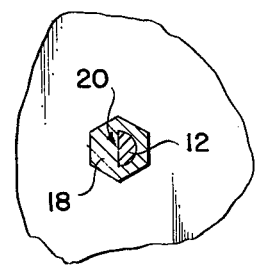

REMOTE CONTROL APPARATUS FOR TELEVISION RECEIVERS

BACKGROUND AND OBJECTS

Television receivers are conventionally provided with a channel selector knob in order to permit the viewer to watch one of several channels. Since, for best viewing, the television receiver is located a number of feet away from the viewer, this necessitates the periodic movement to the receiver to change the channel by manual manipulation of the channel selector knob when it is desired to watch another program. For some individuals, such as the disabled, elderly and bedridden, it is impossible to move to the receiver to change the channel, thereby making them wholly dependent on others for this purpose. Although electronic means have been devised for remotely controlling the channel selector knob, such means require specially designed television receivers which are considerably more expensive than conventional type sets.

It is an object of this invention to provide apparatus for mechanically changing the channel of a conventional television set from a point remote from the set, thereby obviating the necessity of the viewer moving from his position of viewing to change the channel.

Another object is to provide apparatus of the character described which is of simple, economical construction and may be readily attached to and removed from a standard television set in a minimum of time and with a minimum of effort. A further object is to provide apparatus for readily changing the channel setting of a television receiver which comprises an arm which is attached to a control shaft engaged with the channel selector shaft, the arm being selectively engaged with the teeth of a circular member which is in driving engagement with the control shaft, whereby, upon rotation of the arm, corresponding rotation of the channel selector shaft is effected, for changing the channel setting.

A still further object is to provide apparatus of the character described wherein flexible cord means is provided for effecting movement of the arm through an arc from a point remote therefrom.

Other objects will be apparent from the following description of the presently preferred form of this invention taken in connection with the appended drawings.

DESCRIPTION OF THE FIGURES OF THE DRAWINGS

FIG. 1 is a front elevational view of a television receiver illustrating the application of the apparatus of the present invention thereto, and showing the apparatus in inoperative position;

FIG. 2 is a view similar to FIG. 1 illustrating the apparatus of the present invention in its operative position;

FIG. 3 is an exploded perspective view of the apparatus of the present invention per se;

FIG. 4 is an enlarged fragmentary view of the apparatus of the present invention in its initial position;

FIG. 5 is a view similar to FIG. 4 showing the apparatus in its actuated position;

FIG. 6 is a sectional view taken along the line 6—6 of FIG. 5, looking in the direction of the arrows, and FIG. 7 is a sectional view taken along the line 6—6 of FIG. 1, looking in the direction of the arrows.

DESCRIPTION OF THE INVENTION

The apparatus of the present invention is adapted for use with a standard television receiver 10 having a channel selector shaft 12 extending through the front panel thereof, the outer extremity of the shaft being of D-shape in cross-section as indicated at 14.

The apparatus of the present invention is generally indicated at 16 and includes a control shaft 18 of polygonal shape cross-section having at one end thereof a bore of substantially D-shape cross-section as indicated at 20 which complements, and is adapted to receive, the D-shape terminal 14 of shaft 12. An enlarged disc 22 is centrally secured to the opposite terminal of shaft 18, the outer periphery of disc 22 extending substantially beyond the periphery of shaft 18.

In accordance with the present invention, there is provided a lever arm 24, one end of which is enlarged to form a circular hub 26 having a central elongated slot 28 through which shaft 18 passes. One face of circular hub 26 is adapted to engage enlarged disc 22, and the opposite face thereof is provided with an outwardly extending bar-shaped dog 30 of barlike conformation comprising a locking element, which dog is preferably located near the outer periphery of hub 26 and intermediate the longitudinal and transverse axes of elongated slot 28. The opposite terminal of lever arm 24 is provided with an aperture for purposes which will be hereinafter more fully set out.

In association with lever arm 24, there is provided a circular body member 34 having a central opening of polygonal shape as indicated at 36, which opening complements the cross-sectional shape of polygonal shaft 18 to permit mounting of the body member on the shaft in a manner to be rotatable therewith. The outer periphery of circular body 34 is provided with a plurality of like, angularly disposed teeth 38, forming therebetween recessed areas 40 comprising locking elements which complement, and are adapted to selectively receive a peripheral portion of dog 30. As shown to advantage in FIG. 6, the apparatus is so arranged that one face of hub 26 of lever arm 24 is in engagement with a face of disc 22, and the opposite face thereof is adjacent member 34.

Suitable securing means 41 maintain lever arm 24 and body member 34 in the position shown in FIG. 6 to assume proper engagement of dog 30 with the teeth 38.

The present arrangement of body member 34 having teeth 38 and lever arm 24 having dog 30 provides a novel ratchetlike mechanism for actuating channel selector shaft 18 upon rotation of lever arm 24 about shaft 18 as a pivot point. By virtue of elongated slot 28 in circular hub 26, dog 30 will fit into selected recessed area 40 formed by adjacent angularly disposed teeth 38 during counter-clockwise rotation of lever arm 24. However, upon rotation of lever arm 24 in a clockwise direction, elongated slot 28 permits dog 30 to move out of recessed area 40 and override teeth 38, thereby effecting relative rotational movement of lever arm 24 with respect to circular body member 34.

It is further within the contemplation of the present invention to provide a flexible cord 42, one end of which passes through opening 32 of lever arm 24 and is secured to the lever arm terminal. Flexible cord 42 extends upwardly and passes through an eyelet 44 mounted on a stationary object 46 such as a piece of furniture, ceiling, etc. After passing through eyelet 44, flexible cord 42 is drawn into the viewing area of the room in which the television is located, for easy access by a viewer. A suitable pull member 48 is secured to the terminal of the flexible cord held by the viewer.

The apparatus of the present invention is so arranged that, as shown to advantage in FIGS. 4 and 5, when the lever arm 24 is in the down position, dog 30 lockingly engages one of the recesses 40 at the lower right side of the apparatus and, upon rotation of lever arm 24 in a counterclockwise direction, effects corresponding rotation of circular body member 34, control shaft 18 and channel selector shaft 14.

OPERATION

In use of the present invention, the apparatus is readily attached to the receiver set by first removing the channel selector knob of the set and replacing it with the present apparatus, in a manner illustrated in FIG. 6. When properly positioned, lever arm 24 will be in the downwardly extending position illustrated in FIG. 1. After cord 42 has been trained through eyelet 44, the free end of the cord with pull member 48 attached, may be held by the viewer when seated remote from the television set.

When it is desired to change the channel setting, it is only necessary that pull member 48 be actuated, thereby causing an upward force to be exerted on lever arm 24. Since dog 30 is engaged in recess 40 of circular body 34, lever arm 24 and body 34 are in locked engagement so that these two elements are rotated together. In view of the fixed engagement of circular body 34 with shaft 18, a corresponding rotation of this member occurs, and by virtue of the engagement of the D-shaped terminal 14 of shaft 12 in the complemental bore 20 of shaft 18, a rotational force is exerted on channel selector shaft 12 to effect rotation thereof.

The force on cord 42 may be continued until lever arm has passed through an arc of approximately 90°, thereby rotating selector shaft 12 through several channel selections. In order to continue rotation of channel selector shaft 12 until the desired channel is reached, the tension on flexible cord 42 is released, thereby causing the lever arm to drop under its own weight by force of gravity. This permits dog 30 to ride out of engagement with recess 40, due to the loose fit of the circular hub 26 on shaft 18, resulting in relative movement of lever arm 24 with respect to circular body member 34. Channel selector shaft 12 may then be activated once again by pulling cord 42 in the same manner as described above until the desired channel selection is made. Each cycle of operation produces approximately a 90° rotation of selector shaft 12, thereby effecting corresponding movement of the selector shaft through several channels.

With the device of the present invention therefore, simple, economic apparatus is provided for mechanically controlling the channel selector switch of a television from a remote point by a simple hand movement.

By virtue of its simplicity, the present apparatus may be readily engaged with, and removed from, a television receiver as desired so that the standard manual channel selector knob may be re-engaged with the set if desired.

While there has been herein shown and described the presently preferred form of this invention, it is to be understood that such has been done for purposes of illustration only, and that various changes may be made therein within the scope of the appended claims.

What is claimed is:
1. Remote control apparatus for actuating the channel selector of a television receiver having a channel selector shaft, said apparatus including:
   a. control means mounted on, and rotatable with, the channel selector shaft,
   b. a circular member axially mounted on, and rotatable with, said control means,
   c. the outer periphery of said circular member having a plurality of first locking elements,
   d. a lever arm, one end of which is enlarged and provided with an elongated slot,
   e. a second locking element extending from a face of the enlarged end of said lever arm and selectively engageable with the first locking elements of said circular member, for rotating said circular member, control means and channel selector shaft upon rotation of said lever arm in an arc,
   f. stationary means above said lever arm, and
   g. flexible means, one end of which is attached to the free end of said lever arm,
   h. said flexible means extending through said stationary means and the other end thereof being held by the viewer, for rotating the lever arm in an arc upon force being exerted on said flexible means.
2. The remote control apparatus of claim 1, wherein:
   a. said first locking elements comprise teeth, and
   b. said second locking element comprises a dog.
3. Remote control apparatus for actuating the channel selector of a television receiver having a channel selector shaft, said apparatus including:
   a. a control shaft in fixed engagement with the channel selector shaft,
   b. a circular body member axially mounted on and secured to, said control shaft,
   c. the outer periphery of said circular body member being provided with a plurality of like, angularly disposed teeth, forming therebetween recessed areas comprising first locking elements,
   d. a lever arm proximate said circular body member,
   e. one end of said lever arm being enlarged to form a hub provided with a central elongated slot through which said control shaft extends for loosely mounting said lever arm thereon,
   f. a dog extending from one face of said lever arm forming a second locking element selectively engageable with said first locking elements,
   g. a stationary eyelet positioned above said lever arm, and
   h. a flexible cord, one end of which is secured to the free end of said lever arm,
   i. said flexible cord extending upwardly through said eyelet and the other end of the flexible cord being held by the viewer, whereby the lever arm is rotated in an arc upon force being exerted on said flexible cord.
4. Means for rotating a shaft comprising:
   a. a first body member,
   b. means for fixedly mounting said first body member on the shaft,
   c. said first body member being of circular conformation and provided with a plurality of first locking elements,
   d. a second body member, e. said second body member being provided with a central elongated slot through which said means for fixedly securing said first body member to the shaft extends, for loosely mounting said second body member thereon,
f. a second locking element from a face of said second body member and adapted for selective engagement with said first locking element of said first body member, and
g. means for rotating said second body member to effect a corresponding rotation of said first body member and shaft.

5. The means of claim 4 wherein:
a. said means for fixedly mounting said first body member to the shaft comprises a control shaft.

6. The means of claim 5 wherein:
a. said first locking elements comprise a plurality of teeth, and
b. said second locking element comprises a dog.

7. The means of claim 6 wherein:
a. said second body member comprises a lever arm, one end of which is loosely mounted on said means for fixedly mounting said first body member on the shaft, and
b. said means for rotating said second body member comprises a cord fixed to the opposite end of said lever arm.

* * * * *